Patented Oct. 31, 1950

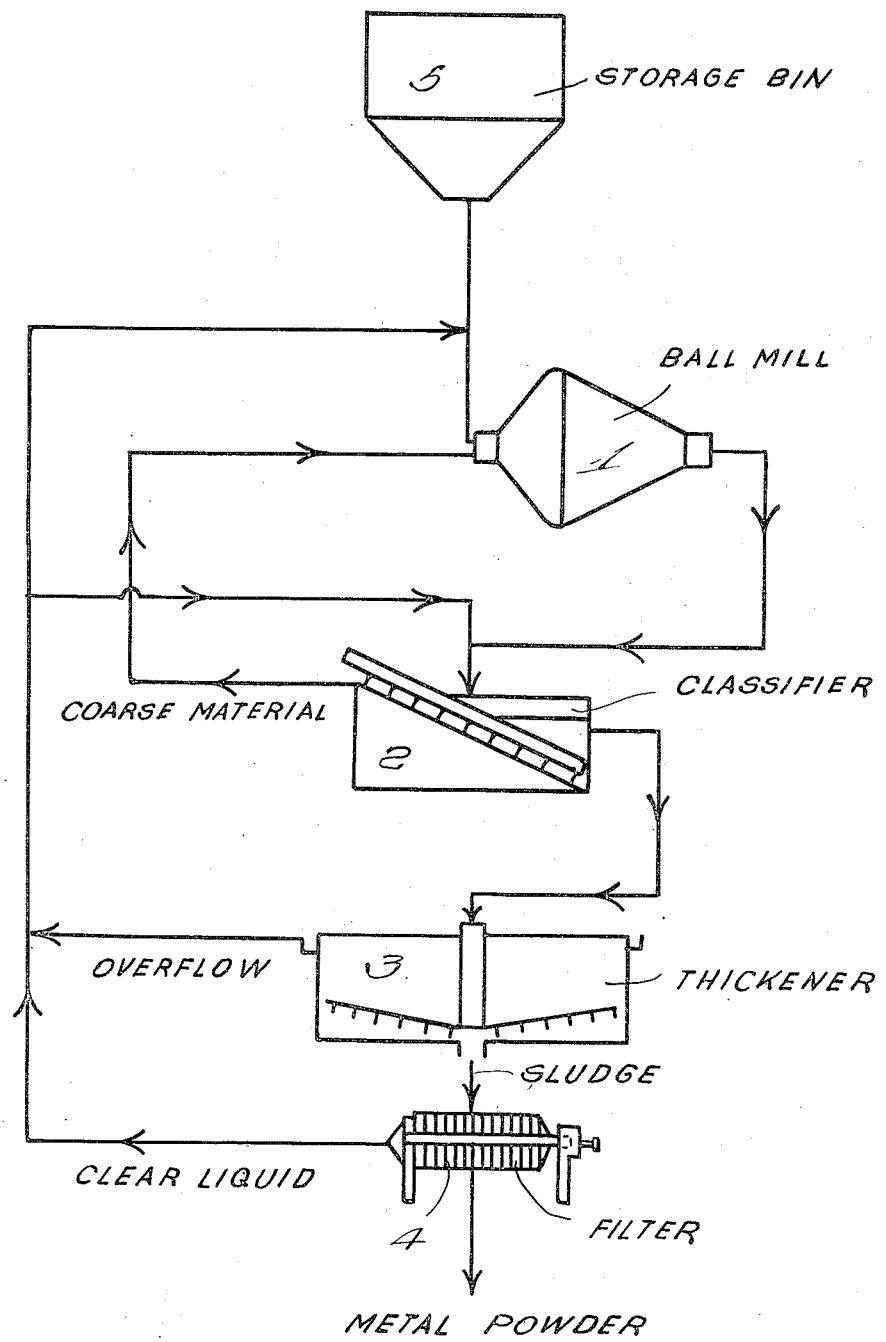

2,528,034

UNITED STATES PATENT OFFICE 2,528,034

MICA-COATED METALLIC PAINT PIGMENTS

Erith Tainton Clayton, Baltimore, Md., assignor, by mesne assignments, to The Tainton Company, Baltimore, Md., a corporation of Maryland Application January 21, 1948, Serial No. 3,536

7 Claims. (Cl. 106—290)

1

The invention relates to a flaked metallic powder consisting of bright, highly reflective metal particles in a fine state of division and in the form of flakes, adapted for use as a pigment for paint when combined with suitable vehicles and provided with a smooth, hard, permanent, protective, wear-resisting, transparent, non-oxidizable film coating, capable of preventing oxidation and thereby maintaining the metal flakes bright and reflective when exposed in a paint applied to surfaces requiring protection, and to the method of manufacture thereof.

Whereas the method hereinafter described may be applied equally well to any metal usually disintegrated for the purpose of making metallic paints, such as gold, silver, bronze, aluminum, cadmium and tin, it is particularly applicable to zinc, for eliminating oxidation thereof, and the coating material is especially well adapted for use as an addition agent to the process of producing the bright zinc flake described in U. S. Patents Nos. 1,954,462 and 2,080,346, granted to U. C. Tainton, April 10, 1934, and May 11, 1937, respectively.

The apparatus shown and described in Patent No. 1,954,462 may advantageously be employed for carrying out the method of the present invention and for producing bright and highly reflective metal flakes provided with said permanent transparent protective coating.

The single sheet of drawing diagrammatically illustrates an arrangement of apparatus by which the desired coating metallic zinc pigment suitable for paint may be made. The apparatus shown employs a wet grinding process and includes a grinding mill as, for example, a ball mill 1, a classifier, for example, a drag classifier 2, into which the pulp from the delivery end of the ball mill flows through a suitable pipeline to the classifier, a thickener 3 into which there is an overflow from the delivery end of the classifier through a suitable pipeline that carries fine metallic particles in suspension with the grinding liquid from the classifier to the thickener wherein the pulp or metallic pigment settles, and a filter 4 into which there is an overflow leading through any suitable pipeline from the thickener to the filter. These parts are connected so that liquid freed, or freed to a certain extent, from the metallic particles, is returned (a) from a portion of the classifier, and (b) from an overflow leading from the thickener, and (c) from the lower portion of the filter—from below or behind the filtering septum—back to the entrance end of the ball mill whereby the wet grinding process can be properly carried out in a continuous manner. The apparatus also has a suitable feeding or storage means 5 that delivers the zinc pieces to be ground into the return line leading to the entrance end of the ball mill.

As explained in said Patent 1,954,462 it is possible, in the presence of a large volume of inert liquid, to quite successfully employ standard grinding equipment. To accomplish this a stream of relatively inert liquid passes through the mill 1 and thereby carries in suspension the metal powder which is undergoing treatment. This inert carrying liquid from the mill then passes to and through the classifier 2 and into the thickener 3 in which the coarser material settles and from which the coarser material is returned to the head of the grinding circuit along with the new feed material, while at the same time the fine flakes and inert liquid carrying the fine flakes is allowed to overflow and is passed to the filter 4, where the fine filtered out flakes or particles are recovered and from which the inert liquid freed of the major portion, if not all, of the fine flakes, is returned to the head of the grinding circuit. When dealing with a feed material composed of finely divided zinc powder such as that obtained from the condensation of zinc vapors, it may be preferable to employ a batch operation using a standard ball mill which is, however, completely sealed to prevent the admission of air during grinding and so minimize any further oxidation of the ultrafine particles in this type of dust.

It is preferable also to add to the liquid inert grinding medium reducing agents, such as an organic oil, either a vegetable or a marine oil, such as linseed oil, rapeseed oil, or menhaden oil, which will combine with and counteract any oxygen introduced into the circuit, and also small amounts of organic acids, such as stearic and oleic acid, which will combine with and thereafter counteract any zinc oxide that may be formed.

The grinding operation is one in which the application of impact pressure and frictional rubbing contact is sufficient to break up and flatten out the metal particles and so completely to change their form by pressure applied in a manner so as to effect a "flow" of the metal into flake-like particles. The grinding includes such steps and operations as may be described as grinding, disintegrating and flattening out and accomplishes a crushing and corresponding spread or extending of the surface of the pieces or particles of raw material operated upon in order to produce the desired finished product. Moreover, this type of grinding is carried out in the presence of inert liquids and should not be confused with grinding sometimes so called, which may involve nothing more than the introducing of metal pigments into a grinding machine to thereby effect an intimate mixing of the pigment portions in or with a liquid with which it is being mixed in the grinding machine and which mixing operation is carried out without disintegration of the pigment particles and without an extending of the surfaces of the pigment particles.

While ordinarily high purity zinc, preferably in powder form, serves best as the raw material, cases may arise where it is advantageous to use a small quantity of another element in solid solution as described in Patent No. 2,011,987. The operation of the bright flaking process is simplified by the use of pure zinc powder of the so-called 4–9 grade. This zinc powder is preferably of the blown variety made by the atomization of molten zinc with air. Normally this blown powder is relatively free of oxides and is of a fairly uniform mesh size with only small amounts of very fine or colloidally sized particles present. In recent years, however, this type of zinc powder has advanced so much in price that it is today approximately 5¢ per pound more than the ordinary grade of impure zinc dust condensed from zinc vapors. When used in paint approximately 10 lbs. of flake are required per gallon and this higher cost for the raw material is a major disadvantage, where the pigment must compete on a cost basis. The use of zinc dust condensed from zinc vapors which is very much finer and more highly oxidized, as a raw material for bright zinc flake making, is much more difficult. The finer feed accentuates the difficulties, such as the production of colloidal particles and loss of luster on exposure in paint films. It will readily be appreciated that the difficulty of forming and polishing flakes from zinc dust increases very rapidly as the particle size decreases. Microscopic examination appears to show that each particle is hit at least five or six or more times during processing. If the flake or zinc particle is hit too hard or flattened too much, it may be further disintegrated, thereby increasing still further the difficulty of polishing the fragments. The tendency to disintegrate is promoted by any brittleness in the particle. Pure zinc metal does not work harden and so does not become brittle. Impure zinc dust may work harden and become brittle. Experiments have shown that some types of condensed zinc fumes are especially apt to cohere in the manner to be described. Flake made from dusts of this type without the use of mica have been granular and almost like coarse sand due to the adhesion of small flakes into larger agglomerations. This coarse material is not suitable for use in paints. As will be explained, the liberal use of mica by coating the small metallic particles tends to prevent over-grinding, adhesion, undue embrittlement, and promote a bright surface with luster retentive properties. The use of mica for the treatment of condensed dusts is further assisted by the use of small diameter balls of ¼ inch or less in diameter. The use of these small shot or balls constitutes a portion of the subject matter of the invention described and claimed in my copending application. The combination of small shot or balls and mica constitutes an important improvement in the processing of any fine zinc powders but is especially desirable in the processing of some types of condensed zinc fumes.

There are a number of problems which occur in the manufacture of bright metallic flakes. Many of these problems are particularly acute in the preparation of finely divided bright flakes made from zinc. One of these problems is the formation of metal particles colloidal in size which are usually black and which materially interfere with the brightness of the metal flakes. Normally this colloidal material has to be removed by a series of washing operations which complicate the flow sheet and which lead to the loss of colloidal metal. These colloids are formed by the excessive grinding of some of the fine metal particles. Special grinding techniques and special liquids have been used to minimize the formation of colloidal material but do not provide a satisfactory solution in themselves.

Another problem in the manufacture of bright metallic flakes is the adhering or sticking together of the chemically clean and bright polished metal surfaces. This is a well known phenomenon, typified by the sticking together of two clean glass plates which can only be separated by a sliding action. The adhesion of metal flakes, particularly zinc flakes, leads to poor results in the operation of the ball mill and produces a very poor brushing pigment because the sticking together of the flakes makes the resulting paint very lumpy and difficult to apply with a brush.

In the case of zinc, one of the problems is the perpetuation of the bright surface of the metal flakes produced by the polishing operation. These flakes may be given a brilliant luster but on outdoor exposure this luster becomes dull and the paint becomes unattractive in appearance.

I have found that I can solve these and other problems by stamping on the metal flakes undergoing treatment a thin film of laminar material such as mica. In effect, what is accomplished is the complete coating of each metal flake with a film of micaceous material which serves to minimize the production of colloidal particles and also to prevent the adhesion or sticking together of the flakes, above referred to. Further, the film protects the underlying zinc surface of the flakes from the tarnishing effects of outdoor exposure. It has been found in addition that the use of mica in the ball mill leads to a substantial increase in the brightness of the flakes produced and it is believed that this is due to the lubricating effect of the mica which thoroughly exposes the individual particles to the action of the steel balls.

The word "mica" in this specification and in the appended claims is used in its broadest generic sense, to include the whole class of hydrated silicates known as mica and which include the minerals muscovite, lepidolite, biotite, phlogopite, paragonite, zinnwaldite and lepidomelane, and which possess the property of cleavage in thin flakes. Those talcs which possess this property of basal cleavage or cleavage in thin flakes, are to be included in the scope of the invention.

It is this property of infinite cleavage of the mica flakes which makes this material so valuable an addition agent to the processing of the bright metal flakes. The film of mica on the metal flakes is extremely fine and the adhesion is so good the mica may not be removed by any washing operations or any of the ordinary operations involved in painting, nor does the mica film or coating separate when the paint is exposed to weathering. The existence of this mica film can be determined by dissolving the zinc in acid when the residual mica which is insoluble in the acid is left behind.

From what has been said it will be understood that when mica is present in a charge of metal which is being ground or polished, the lamina which compose it are separated into separate entities and are stamped onto the surface of the metal flakes being treated. The effect of this is to provide the metal flakes with an extremely thin, permanent, transparent covering or coating of an inert material which prevents oxidation and which is wear resistant.

Another effect of the mica is to cushion the blow of the steel balls on the metal particles and to prevent the chipping off of colloidally fine metal fragments which, when present, mar the brightness of the flakes.

The addition of mica to the grinding and polishing operation is a further advantage by virtue of the lubricating action which it exerts. This increases the grinding efficiency and appears to assist in preventing agglomeration of the particles, thereby exposing all particles to the polishing action of the steel balls in the polishing liquid, and thereby increasing the brightness of the flakes as a whole.

The invention should not be confused with the common practice of using inert extenders in the formulation of paints. Such inert extenders as asbestine, barytes, etc. are mixed with various types of paint.

It is sometimes an advantage to use certain of these extenders when making paint of bright metal flakes produced in accordance with the present invention. This bright metal flake has been formulated into paint with mica with certain advantages, but this use is distinct and separate from the use of mica as an addition agent in the grinding operation during the actual manufacture of the bright metal flake.

Due to its property of infinite subdivision, it is unnecessary to use any considerable quantity of mica to secure all of the beneficial results obtained from its use. Mica to the extent of one-fourth of one per cent (¼ of 1%) of the weight of metal undergoing conversion to the bright flake form is usually sufficient. In the usual practice of the invention, one-half of one per cent to one and one-half per cent (½ of 1% to 1½%) of the weight of metal is used. Beneficial results have been obtained with larger proportions than this but a greater amount is not necessary to secure the full benefits of this material, although up to fifteen per cent (15%) of the weight of metal being polished has been used with advantage. The small quantities of mica outlined above serve to distinguish this invention from others in which aluminum is stamped on to mica in an operation designed to apply to what is essentially a pigment made of mica a superficial coat of aluminum to impart the appearance and characteristics of this metal at low cost. In this other process the aluminum is the minor ingredient and is the coating material, and the mica is the main ingredient, and is usually present to the extent of about 80% of the total weight of solids in the pigment.

The improved ball mill operation that results from the presence of mica in the charge results in a proper polishing with a smaller charge of balls than would be necessary if the mica were absent. Also, the presence of mica in the charge permits reduction in the weight of the balls used and contributes to the production of a superior product by reducing the amount of iron contamination from the grinding medium.

It is to be understood that while the process herein described is especially applicable to the production of zinc and zinc alloy flakes, it is not to be construed as being limited to this field, for the process has broad fields of application and, for example, may be applied to the manufacture of flakes of other metals, such as aluminum, copper, brass, cadmium, lead, nickel, silver, gold, tin, bronze etc.

What is claimed is:

1. A metallic powder suitable as a pigment for paint, consisting of metallic flakes having smooth, bright surfaces and provided with a thin, hard, permanent, adherent coating of mica present in the proportion of less than 5% of the weight of the metal.

2. A metallic powder suitable as a pigment for paint, consisting of zinc flakes having smooth, bright surfaces and provided with a thin, hard, permanent, adherent coating of mica present in the proportion of ¼ of 1% to 15% of the weight of the metal.

3. A metallic powder suitable as a pigment for paint, consisting of metallic flakes having smooth, bright surfaces and provided with a thin, hard, permanent, adherent coating of mica present in the proportion of ¼ of 1% to 15% of the weight of the metal.

4. The method of producing a metallic paint pigment consisting mainly of metal particles in the form of flakes having smooth, bright surfaces, by grinding finely divided portions of metal beneath the surface of a liquid solvent for oil but inert to the metal and containing a natural organic drying oil capable of absorbing oxygen at room temperature and mica as an addition agent, which mica is stamped on to the surfaces of the metal flakes in the proportion of ¼ of 1% to 15% of the weight of metal.

5. The method of producing a metallic paint pigment consisting of coated metal particles in the form of flakes having smooth, bright surfaces by grinding finely divided portions of metal beneath the surfaces a natural organic oil and a solvent compatible with the oil and containing mica in the proportions of ¼ of 1% to 15% of the weight of the metal to coat the metal flakes with an adherent coating of mica.

6. A process of converting finely divided zinc powder such as that obtained from the condensation of zinc vapors into smooth bright surfaced flakes by grinding in the presence of a liquid grinding medium which contains a mica, which mica is stamped on the zinc flakes to provide a thin permanent adherent mica coating thereon to prevent adhesion of the bright surface of the zinc flakes in the proportion of ¼ of 1% to 15% of the weight of metal.

7. The method of producing a metallic paint pigment consisting mainly of zinc particles in the form of flakes having smooth, bright surfaces, by grinding finely divided portions of zinc beneath the surface of a solvent for oil and a vegetable oil and containing mica as an addition agent which mica is coated on the zinc particles in the proportion of ¼ of 1% to 15% of the weight of metal.

ERITH TAINTON CLAYTON.

REFERENCES CITED

The following references are of record in the file of this patent:

UNITED STATES PATENTS

| Number | Name | Date |
| --- | --- | --- |
| 2,278,970 | Atwood | Apr. 7, 1942 |
| 2,394,843 | Cooke et al. | Feb. 12, 1946 |